Figures 1, 5, 6:
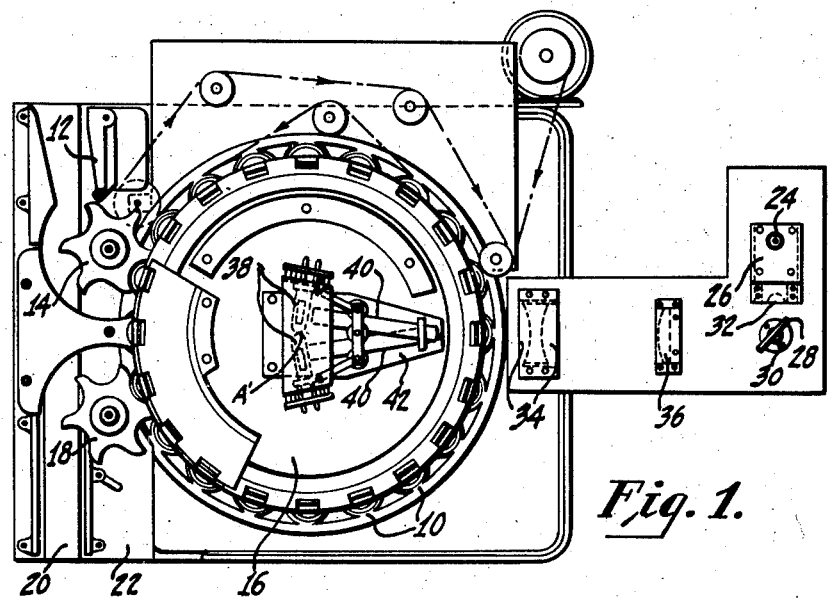

Aug. 26, 1947.   E. W. KELLOGG   2,426,355
BOTTLE INSPECTION APPARATUS
Filed Sept. 27, 1944   2 Sheets-Sheet 1

INVENTOR.
EDWARD W. KELLOGG
BY
ATTORNEY

Patented Aug. 26, 1947

2,426,355

UNITED STATES PATENT OFFICE 2,426,355

BOTTLE INSPECTION APPARATUS

Edward W. Kellogg, Indianapolis, Ind., assignor to Radio Corporation of America, a corporation of Delaware Application September 27, 1944, Serial No. 555,921

13 Claims. (Cl. 250—41.5)

This invention relates to apparatus for inspecting the fluid contents of bottles or other transparent containers to ascertain whether foreign particles are present therein, and pertains more particularly to an optical system for use in such apparatus.

In one form of practical bottle inspection apratus, the method of inspection depends upon the movement of a foreign particle into or out of a beam of light passing through the bottle and illuminating one or more photoelectric cells. Sensitivity is secured by the use of electrical impulses resulting from abrupt changes in the photoelectric current. These impulses are amplified to any degree required and used to operate a relay which will cause the rejection of a bottle containing a foreign particle.

The bottles whose contents are to be inspected are transferred to a circular turret about which they revolve, and are inspected during such revolution without stopping or slowing down the passage of the bottles through the inspection apparatus. For this purpose, an optical system embodied in the apparatus is mounted on an arm which moves with the bottle under inspection during the inspection period and is then brought back quickly to inspect the succeeding bottle. The arm is pivoted at the center of the turret, extending radially towards the circular line of bottles, and in a practical embodiment may carry a lamp and five lenses for differential illumination of various portions of the bottle, while a bank of ten photocells is mounted on an extension of the arm outside the circle of bottles. The mass of the arm and the optical system which it must carry is considerable, and the vibration and mechanical shock which it sustains as the swinging arm is repeatedly brought back reduces not only the life of the various elements but also the sensitivity of the system, because the sensitivity has to be limited to avoid getting false rejections due to microphonic action of tubes or other circuit elements. Looked at in another way, it is impossible to speed up the inspection and, at the same time, maintain sufficient sensitivity for reliable inspection.

It is accordingly an object of the invention to provide improved bottle inspection apparatus which shall be free from the defects hereinbefore mentioned.

It is a particular object of the invention to provide improved apparatus by means of which the contents of bottles may be inspected more speedily than heretofore.

Another object of the invention is to provide improved bottle inspection apparatus having greater sensitivity than similar apparatus of the prior art.

Another object of the invention is to provide an inspection system, the functioning of which will not be impaired by microphonic effects in circuit elements.

A further object is to provide improved bottle inspection apparatus, the elements of which will have a longer working life than in similar apparatus of the prior art.

Another object is to provide improved means whereby to reduce the mass of reciprocating parts in the optical system of bottle inspection apparatus.

These objects are achieved in accordance with the invention by causing a beam of light from a source outside the circle which constitutes the path of the bottles to follow each bottle during the inspection period, and return speedily to pick up the next bottle. A lens system redirects the beam radially through the bottle toward the center of the circular path followed by the bottles. The photocells may be made to swing with the bottle inside the circle (instead of outside, as formerly), or they may be placed at or near the center of the turret, means hereinafter described being in that case provided for collecting the light emerging from the bottles and for delivering it to the cells. The mass of moving parts of the optical system is thus substantially reduced and replaced by the moving beam, while those parts that do move travel a much shorter distance, and the difficulties resulting from mechanical shock and vibration are thus much reduced.

Figure 2:
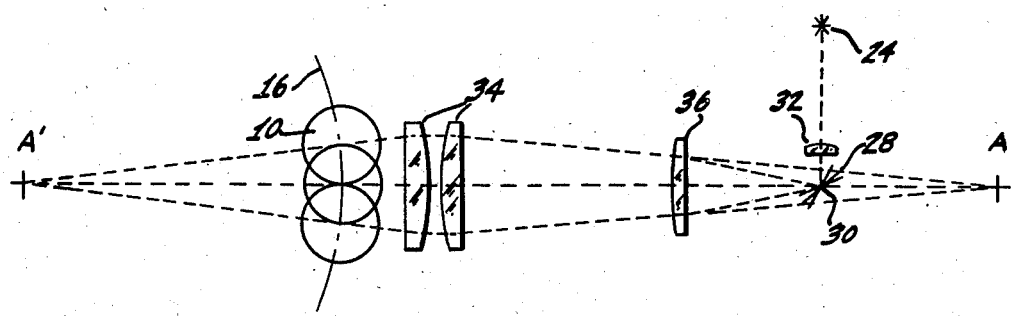
Figure 3:
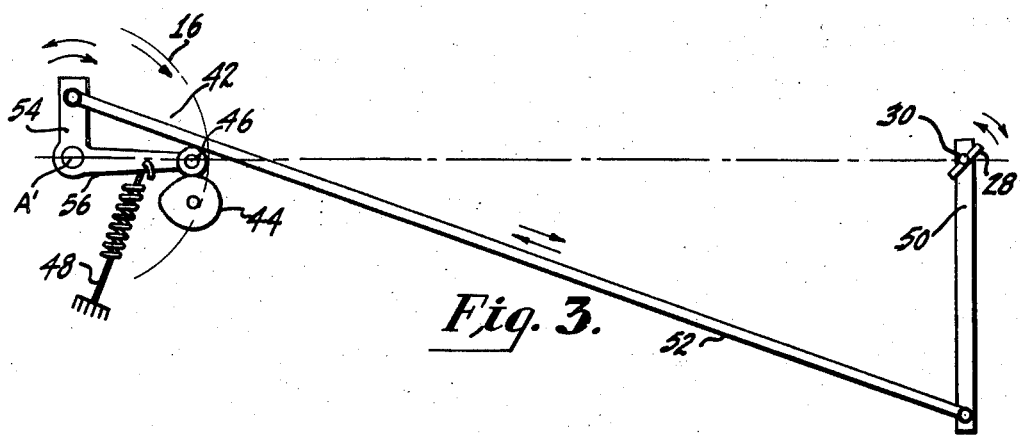
Figure 4:
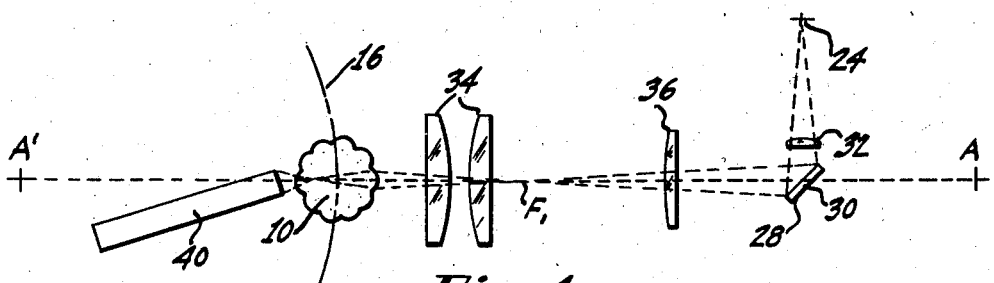

The invention may be better understood from a consideration of the following more detailed description of a preferred embodiment thereof, when read in conjunction with the accompanying drawings, in which:

Figure 1 is a plan view of a preferred embodiment of the invention,

Figure 2 is a diagram illustrating the operation of some of the optical elements of the invention, Figure 3 is a plan view in simplified form of the mechanism for securing synchronism between the movement of the inspecting beam and of the bottle under inspection, and Figures 4, 5 and 6 are diagrams similar to Fig. 2, illustrating the manner in which different portions of the bottle are illuminated.

Referring to Fig. 1, bottles or other transparent containers 10 are transferred from a conveyor 12 by means of a star-wheel 14 to a turret 16, about the circular perimeter of which they revolve until they reach a second star-wheel 18. The bottles are automatically inspected during a portion of their circular passage between the two star-wheels. If they pass inspection, they are transferred to a conveyor 20 which is an extension of the conveyor 12; but if solid particles are found in the contents of any bottle, the bottle is diverted to a conveyor 22 whence it passes to an auxiliary accumulating table (not shown).

The optical system for the inspection of the bottles includes a stationary lamp or other source of light 24 which may have a helical filament and be contained within a housing 26 outside the turret. A plurality of suitable lenses indicated at 32 direct light to a rocking mirror 28, which is pivoted about its vertical axis 30. The mirror may be placed about eighteen inches outside the circular line of bottles. Interposed between the lamp 24 and the mirror 28 is a concentrating lens or lenses (of the group 32) which provide differential illumination for different portions of the bottle under inspection in a manner hereinafter explained. The reflected beam obtained by directing light from the lamp to the mirror may be made to swing in an arc by rotating the mirror about its axis. It is desired to redirect this reflected beam so that it passes radially from outside the circle through the bottle to the center of the turret, and so that the beam will follow the bottle while it is being inspected, for it is necessary not only that the inspection beam shall not move during the inspection period, with respect to the surface of the bottle, but also that its direction with reference to the bottle shall not change. For this purpose, directing lenses 34 are stationed outside of and adjacent the circular line of bottles. Their operation may be better understood by reference to Fig. 2.

The conjugate focal points of the lenses 34 are the points designated A and A', of which the latter is at the center of the turret. A lens 36 may be interposed between the rocking mirror and the lenses 34. A is the position of the virtual image of the mirror axis 30, as produced by lens 36, so that as seen from 34, the rocking mirror appears to be at A. Thus, light rays coming from A in various directions would be redirected by lens 34 to the turret center A'. Another way of describing this part of the optical system is to say that the mirror axis 30 and turret center A' are conjugate focal points of the combined lens system constituted by the lenses 34 and 36, and that the rays leaving the axis in various directions as the mirror oscillates are redirected by this combination of lenses and strike the bottles radially. The lens system may consist of a single lens or a plurality of lenses, the only requirement being that one of its focal points shall be at the center of the turret and the other at the axis of the mirror. The effect, therefore, of the lens system is to make the direction of the light radial so that it passes from outside the circle through the bottle under inspection to the center of the turret, and the combined effect of the optical system so far described is the same as though the source of light were at the end of a long arm pivoted at the turret center, and swinging back and forth at a velocity suitable for following each bottle in turn.

Photocells or other light-responsive means must be placed so as to receive the light after it passes through the bottle under inspection, so that if a particle in the contents of the bottle intercepts the light, the variation in light will be detected by the cells. In certain practical bottle inspection apparatus there are ten photocells arranged substantially in a single vertical column, but electrically connected, alternately in two banks of five cells each, every odd-numbered cell, counting from the bottom, being in one bank and every even-numbered cell being in the other bank. The banks are connected to opposite terminals of an apropriate push-pull amplifiction system, so that if a particle does not alter the amount of light passing to the photocells, but merely disturbs the balance of light passing to the two banks, the reject mechanism will be actuated. Such a system is more sensitive and more reliable than one depending only on changes in the total amount of light transmitted through the bottle.

In the inspection system mentioned above, the photocells are located as close together as possible in order to receive as much of the transmitted light as possible. The tier of photocells is mounted on the swinging arm, just outside the bottles. It would be possible to combine the rocking mirror system of illuminating the bottles, as herein described, with a double vertical tier of photocells, the photocells being located just inside the row of bottles. Such an arrangement, as compared with the said commercial system, would materially reduce the radius at which the photocells swing, and make it possible to employ a simpler, smaller, and more rigid carriage for the photocells, thereby reducing vibration.

In order further to reduce the movement of the cells, and thereby to reduce vibration and mechanical shock to a minimum, the two banks of cells designated in Fig. 1 by the reference numeral 38 may be placed as close to the center of the turret as possible. Since however, the light which emerges from the bottle is considerably scattered by the bottle, it is impractical to use a lens system to transmit the light from the bottle to the photocells. To deal with this difficulty, use is made of the light-transmitting and -confining properties of certain transparent plastic materials, of which methyl methacrylate, or that form of it known as "Lucite," may be cited as an example, although other highly transparent plastic materials, or glass may be employed.

"Lucite" rods 40, which may be of rectangular cross-section, are placed to extend from close to the bottle under inspection to the photocells 38. The rods are polished on all sides to prevent as far as possible the escape of light except at the ends. With ten photocells an equal number of rods may be used, and since they are of rectangular cross-section they may be stacked one upon the other to cover the entire height of the bottle under inspection, thus collecting all of the light that falls within the large rectangle which contains the ends of the rods; whereas if photocells were packed as closely as possible, much light would be lost between adjacent cells. Alternate rods may be made to diverge to the cells in each bank, as shown in Fig. 1, thus making it possible to space the cells apart by twice the thickness of the "Lucite" bars.

Instead of plastic rods, tubes of appropriate material may be employed; their inner surfaces should be highly polished or covered with a highly reflecting film to transmit light by specular reflection with a minimum of light loss.

The photocells 38 and the rods 40 or other light-transmitting means are mounted on a plate or other appropriate support 42, above the turret floor and pivoted at A', the center of the turret. This assembly is caused to move in synchronism with each bottle during the inspection period, and then to swing back quickly to inspect the next bottle, by means of apparatus beneath the turret floor illustrated in Fig. 3. This includes a crank 56 pivoted at A' and operatively associated with a cam 44 attached to the drive shaft (not shown) of the turret, a cam follower 46 and a return spring 48. The rocking mirror 28 is mounted on a support 50 connected by a rigid link or bar 52 with a crank 54 which may be an integral part of the crank 56 pivoted at A'. Thus, the light beam derived from the source 24, as well as the light-collecting and responsive means constituted by the cells 38 and rods 40, moves with each bottle under inspection and then returns quickly to inspect the next bottle.

The lenses 32 interposed between the light source 24 and the mirror 28 provide differential illumination for different portions of the bottle. It is desirable for effective inspection, that the light beams be brought substantially to focus horizontally at some point within the bottle, preferably near the first or else the second wall of the bottle. The more concentrated the beam, the greater will be the disturbance when a small foreign particle passes through it. Fig. 4 shows a beam suitable for illuminating the reeded or fluted portion of a bottle of a type widely used for carbonated beverages. The flutes in question are convex and act as vertical axis cylindrical lenses. If the light beam is to be brought to focus by these convex flutes near the far wall of the bottle, it was ascertained experimentally that the beam must be somewhat divergent at the point where it strikes the bottle. This is brought about, as illustrated in Fig. 4, by employing a lens at 32 of such strength that the helical filament of the lamp 24 is brought to focus at a point $F_1$ at a suitable position between the bottle 10 and the mirror 28. On the other hand, for inspecting the upper zone of such bottles, where the fluting is absent but letters are moulded into the glass, best results are obtained by having the lens system bring the beam to focus just inside the near wall of the glass; for although an equally good focus near the far wall would be preferable, it is not possible to get a good focus near the far wall on account of the scattering effect of the letters which increases with increasing distance between the lettering and the focal plane. Fig. 5 shows a beam suitable for illuminating the lettered portion of such a bottle. This calls for a somewhat weaker cylindrical lens at 32 than was required for the beam shown in Fig. 4.

The manner in which lenses of a certain strength may be used for shaping the beam to inspect one portion of the bottle, and lenses of another strength for shaping a beam to inspect another portion, is illustrated in Fig. 6. Figs. 2, 4 and 5 are all illustrative of horizontal projections or plan views of the light beams and do not show what happens in the vertical plane, this last being shown in Fig. 6. The separation of the two beams corresponding to Figs. 4 and 5, respectively, with appropriate refraction for each, depends upon the fact that the filament of lamp 24 is a relatively small source, and a boundary line between two components 37 and 38 of the lens system 32 would cast a sufficiently sharp shadow at the bottle to meet the requirements. Some overlap of the two beams at the bottle does no harm.

Fig. 6 also shows how an additional light beam is provided for inspection of the bottom of the bottle. In the horizontal plane, the bottom inspection beam should be much like that used for inspection of the lettered portion of the bottle and shown in Fig. 5. Hence it is passed through the same cylindrical lens 38 as the beam of Fig. 5. It is further desirable, however, that the bottom inspection beam be inclined downward to the lower part of the bottle, and this is accomplished by passing it through a prism 39, which deflects it downward. The surfaces of prism 39 are also given some convex curvature, so that they act as horizontal axis cylindrical lenses of sufficient power to concentrate the beam vertically, so that it will illuminate only the desired portion, near the bottom. It will be noted by reference to Fig. 6, that lens 36 also serves to reduce the vertical spread of all three of the light beams, this lens being designed to have positive power in both planes. Lens 36 may be a simple spherical lens, but in adapting the invention to inspection of other types of containers it may be found that a difference in the lens powers in the vertical and horizontal directions is desirable.

The employment of a rocking mirror is not the only practical method of causing a light beam to swing with relatively small amplitude of motion of physical elements. For example, in the present application the mirror may be omitted and the housing assembly 26, comprising lamp 24 and lens system 32, moved into approximate coincidence with the axis connecting the present mirror and turret centers; the housing 26 may, in that case, be moved through a small arc. Still another arrangement is to leave the lamp stationary at the center of rotation and move only the lenses and masks that determine the initial formation of the light beam. When this is done the lamp may participate in the rotational movements; or if the lamp is of such a design that its radiation in various horizontal directions is uniform throughout the required angle, as for example a lamp with a single vertical-axis helix, the lamp may be located at the center of rotation and the lens and masks caused to move in an arc around the lamp as a center. It is to be understood that the invention is not limited to the construction which employs a mirror for deflecting the light beams, but may include other devices such as just mentioned, whereby the light beam may be caused to swing throughout the required range without appreciable change in the shape or intensity of the beam during its motion, and whereby the necessary total linear range of movement required at the inspection point is obtained with relatively small movements of physical parts.

In the development of the preferred embodiment of the invention herein described, it was found that when the optical elements were so arranged as to give effective shapes to the several light beams and to have each beam cover the appropriate portion of the bottle, the sensitivity for picking up foreign particles was not equal in the several zones, and the extra sensitivity in one of the zones was accompanied by increased tendency to produce false rejections. It was found desirable to reduce the intensity of one of the beams by interposing adjacent one of the lenses of combination 32 a neutral density or light-absorbing glass 60 (Fig. 6). This may be, for example, a glass plate a portion of one or both surfaces of which is thinly metallized, thereby reducing the intensity of that portion of the beam transmitted through the metallized surface, but without refracting that portion of the beam or otherwise affecting its optical properties. When this was done, the effectiveness of the system for inspection was not appreciably impaired and trouble from false rejects was substantially decreased. It should be understood that the amplifier system, by which the fluctuations in light at the photocells cause relays to act and the reject mechanism to operate, is provided with gain controls by which overall sensitivity may be adjusted, and that the gain in the amplifier is adjusted to be high enough to give the required inspection sensitivity, but not high enough to cause spurious rejections.

One of the sources of light fluctuation which gave rise to some spurious rejections was due to reflections from the surfaces of lenses 34. Reflections occur not only at the surface of the bottle but at each of the glass-to-air surfaces of lenses 34, and these reflections resulted in a feeble illumination of the bottle surface, or "ghost" images, which unlike the main inspection beam were not stationary with respect to the bottle during the inspection period, and the consequent light fluctuations caused some false signals or rejections. The reflections from the surface of the bottles cannot be prevented, but if the reflectivity of the surfaces of lenses 34 can be largely reduced the light reflected from the bottle will not return to the bottle, and therefore will do no harm. Such a reduction in the reflection from the surfaces of lens 34 was provided by coating the lenses with a quarter-wave layer of material having a low index of refraction, this being a well-known expedient for reducing reflections at glass-air surfaces. The reflection-reducing expedient just mentioned is most effective at a certain wave length. At other wave lengths, although the treatment is helpful, it does not accomplish quite as much reduction. The treatment given the surfaces of the lenses in this case is such as to minimize reflections for red light, for the reason that the liquid being inspected transmits mostly red light and light of other colors does not reach the photocells. The use of a neutral density filter for reducing the intensity of a part of the beam which illuminates a portion of the bottle under inspection, and of means for reducing reflection from the surfaces of the lenses 34, is described and claimed in a co-pending application of James H. Reynolds for "Bottle inspection apparatus," Serial No. 555,920, filed September 27, 1944, and assigned to the same assignee as the instant application.

There has thus been described an optical system for bottle inspection apparatus in which the disadvantages of limited sensitivity and speed, and limited life of the component elements caused by vibration and mechanical shock, have been avoided by the use of an optical system, together with appropriate mechanical coupling, for causing a beam of light to follow the bottle under inspection and pass to the center of the turret about which the bottle revolves. Movement and vibration of light-responsive means included in the system are reduced to a minimum by locating said means at the center of the turret, and providing rods of transparent plastic material or tubes with reflecting inner surfaces to collect the otherwise scattered light emerging from the bottle under inspection and delivering it to the light-responsive means. It has been found possible to inspect at least 165 bottles per minute satisfactorily with apparatus employing such a system, as compared with a maximum satisfactory speed of 120 bottles per minute for apparatus of the prior art.

I claim as my invention:

1. In apparatus for the photoelectric inspection of the contents of a transparent container which moves for a predetermined inspection period in a circularly arcuate path, the combination of a stationary source of light outside said path, means for directing light from said source during said period through said container to the center of said path and in a radial direction with respect to said path, and light-responsive means positioned in the path of said directed light and adapted to move in synchronism with said container during said period in a path concentric with, but of smaller radius than the path of said container.

2. In apparatus for the photoelectric inspection of the contents of a transparent container which moves for a predetermined inspection period in a circularly arcuate path, the combination of a stationary source of light outside said path, means for reflecting light from said source, means for directing the reflected light through said container to the center of said path, light-responsive means adapted to move in synchronism with said container during said period in a path concentric with, but of smaller radius than the path of said container, and means for causing said reflected light to move in synchronism with said container while at the same time being directed radially with respect to said path during said period, and while maintaining said light source in a stationary condition.

3. In apparatus for the photoelectric inspection of the contents of a transparent container which moves for a predetermined inspection period in a circularly arcuate path, the combination of a stationary source of light outside said path, means for deriving from said source a beam of light, means for directing said beam through said container to the center of said path, light-responsive means adapted to move in synchronism with said container during said period in a path concentric with, but of smaller radius than the path of said container, means for causing said beam to move in synchronism with said container during said period, and means for maintaining said beam during said last-mentioned movement in a radial direction with respect to said path.

4. In apparatus for the photoelectric inspection of the contents of transparent containers, each of which in turn moves for a predetermined inspection period in a circularly arcuate path, the combination of a stationary source of light outside said path, means for directing light from said source during said period through the container under inspection to the center of said path and in a radial direction with respect to said path, and light-responsive means adapted to move during said period in synchronism with the container under inspection in a path concentric with, but of smaller radius than the path of said containers.

5. In apparatus for the photoelectric inspection of the contents of a transparent container which moves for a predetermined inspection period in a circularly arcuate path, the combination of a stationary source of light outside said path, means for directing light from said source during said period through said container to the center of said path and in a radial direction with respect to said path, light-responsive means inside said circular path, means for transmitting light directed through said container as aforesaid to said light-responsive means, and means for moving said light-transmitting means in synchronism with said container during said period.

6. In apparatus for the photoelectric inspection of the contents of containers of transparent but light-scattering material, each of which in turn moves for a predetermined inspection period in a circularly arcuate path, the combination of a stationary source of light outside said path, means for directing light from said source during said period through the container under inspection to the center of said path and in a radial direction with respect to said path, light-responsive means inside said circular path, means for collecting, confining and transmitting light directed through said containers as aforesaid to said light-responsive means with a minimum of light loss, and means for moving said light-responsive means and said light-transmitting means during said period in synchronism with the container under inspection.

7. The combination according to claim 6, wherein said means for collecting, confining and transmitting light are constituted by elongated members of a transparent plastic material extending from the container under inspection to said light-responsive means.

8. The combination according to claim 6, wherein said means for collecting, confining and transmitting light are constituted by tubes having specular inner surfaces and extending from the container under inspection to said light-responsive means.

9. In apparatus for the photoelectric inspection of the contents of a transparent container which moves for a predetermined inspection period in a circularly arcuate path, the combination of a stationary source of light and a mirror outside said path, said mirror being pivoted about its vertical axis, means for directing light from said source to said mirror whereby to derive therefrom a reflected beam of light, means for directing said reflected beam through said container to the center of said path, light-responsive means adapted to move in synchronism with said container during said period in a path concentric with, but of smaller radius than the path of said container, means for rotating said mirror about said axis during said period in synchronism with said container, and means for maintaining said reflected beam in a radial direction with respect to said path during said rotation.

10. In apparatus for the photoelectric inspection of the contents of a transparent container which moves for a predetermined inspection period in a circularly arcuate path, the combination of a source of light and a mirror outside said path, said mirror being pivoted about its vertical axis, means for directing light from said source to said mirror whereby to derive therefrom a reflected beam of light, a lens system having its conjugate focal points at said axis and the center of said path, respectively, for directing said reflected beam through said container to said center, light-responsive means located to receive light from said beam passing through said container and adapted to move in synchronism with said container during said period in a path concentric with, but of smaller radius than the path of said container, and means for rotating said mirror about said axis during said period in synchronism with said container.

11. Apparatus for the photoelectric inspection of the contents of a series of transparent containers, including means for moving each of said containers in turn through an inspection zone for a predetermined inspection period, said zone being a portion of a circular path, a source of light and a mirror outside said path, said mirror being pivoted about a vertical axis, a mount for said mirror, means for directing light from said source to said mirror whereby to derive therefrom a reflected beam of light, a lens system having its conjugate focal points at said axis and the center of said path, respectively, for directing said reflected beam transversely of said inspection zone to said center, light-responsive means located within the circle constituting said path to receive light from said beam passing through said containers, elongated members of transparent plastic material extending from said zone to said light-responsive means, a mount pivoted at said center for said light-responsive means and said members, and means including a cam and cam follower associated with said last-mentioned mount and said container-moving means, and mechanical coupling between said last-mentioned mount and the mount for said mirror, for moving said reflected beam, said members and said light-responsive means in synchronism with the container under inspection during each of said inspection periods.

12. In apparatus for photoelectric inspection of the contents of transparent containers which move for a predetermined inspection period in a circularly arcuate path, the combination of a stationary source of light external to said path, means for limiting and concentrating light from said source into a beam for the inspection of the contents of each of said containers successively, means for reciprocating said beam synchronously with said containers whereby said beam is caused to illuminate one container continuously during its inspection period and to return for inspection of another container, refracting means for causing said beam to follow said containers in a direction tangent to said arcuate path during said inspection period, photoelectric means within said path responsive to changes in intensity or distribution of light transmitted through said containers, and means within said path for collecting light from points adjacent said containers and transmitting said light to points adjacent said photoelectric means, said light-collecting and -transmitting means being adapted to move in synchronism with each container during the inspection period.

13. In apparatus for photoelectric inspection of the contents of containers of transparent but light scattering material which move for a predetermined inspection period in a circularly arcuate path, the combination of a source of light external to said path, means for limiting and concentrating light from said source into a beam for the inspection of the contents of each of said containers successively, means for reciprocating said beam synchronously with said containers whereby said beam is caused to illuminate one container continuously during its inspection period, and to return for inspection of another container, refracting means for causing said beam to reach said containers in a radial direction with respect to said path, a plurality of photoelectric devices within said path and responsive to changes in intensity or distribution of light transmitted through said containers, and means within said path adapted to move in synchronism with each container during the inspection period for collecting light transmitted through and scattered by said container from points adjacent said container, for dividing said light into components corresponding in number to the number of said devices, and for transmitting said components to said devices respectively.

EDWARD W. KELLOGG.

REFERENCES CITED

The following references are of record in the file of this patent:

UNITED STATES PATENTS

| Number | Name | Date |
|---|---|---|
| 2,132,447 | Stout | Oct. 11, 1938 |
| 1,925,814 | Nicolson | Sept. 5, 1933 |
| 2,124,802 | Wallace | July 26, 1938 |